Sept. 6, 1927.
T. E. DAVIS
LIQUID DISPENSING FAUCET
Filed May 26, 1927
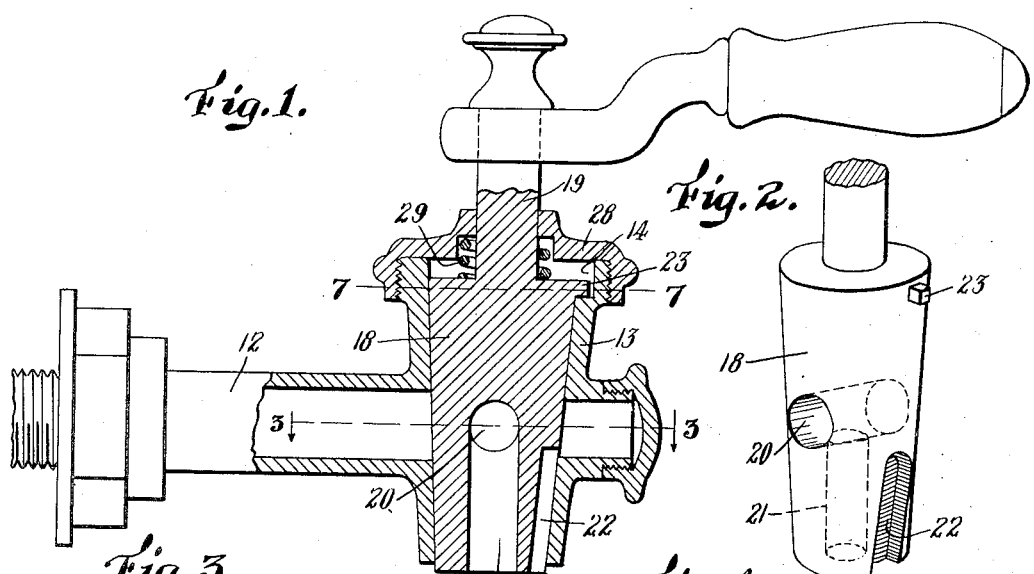
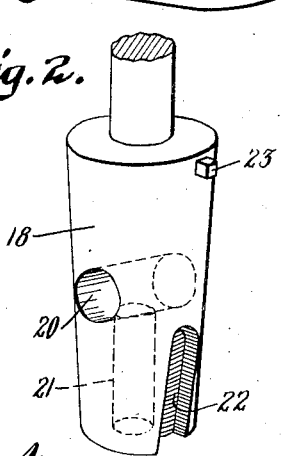
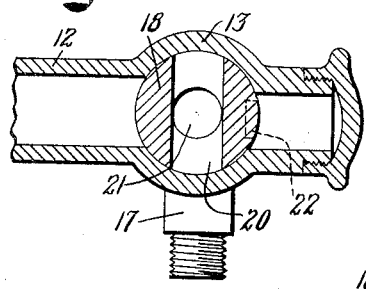
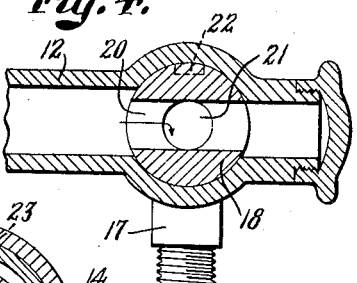
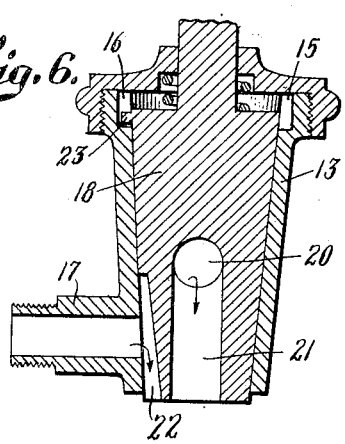
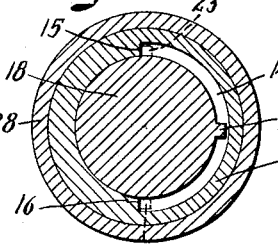
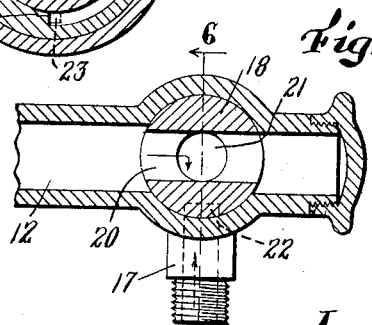
Inventor
T. E. Davis
by Wright Brown Quinby Atty
Att'ys.

Patented Sept. 6, 1927.

1,641,534

UNITED STATES PATENT OFFICE.

THOMAS E. DAVIS, OF ARLINGTON, MASSACHUSETTS.

LIQUID-DISPENSING FAUCET.

Application filed May 26, 1927. Serial No. 194,493.

This invention relates to a faucet adapted to dispense two liquids, such as coffee and cream, the faucet including an internally tapered casing and an externally tapered plug valve adapted, when turned in one direction in the casing, to dispense coffee only, and when turned in the opposite direction, to dispense coffee and cream simultaneously.

The invention is embodied in certain improvements whereby a faucet is adapted to be quickly and accurately adjusted to perform either of the above-mentioned functions, to keep each liquid separated from the other until both are discharged, and to maintain a close fit between the plug valve and its seat in the casing, by a spring which is remote from the discharging portion or end of the valve, so that said end is unobstructed and has sufficient area to contain the outlet ends of two independent ducts.

Of the accompanying drawings forming a part of this specification—

Figure 1 shows partly in elevation, and partly in section, a faucet embodying the invention, the faucet being closed.

Figure 2 is a perspective view of the plug valve shown in section by Figure 1.

Figure 3 is a section on line 3—3 of Figure 1.

Figure 4 is a view similar to Figure 3, showing the faucet adjusted to dispense coffee only.

Figure 5 is a view similar to Figure 3, showing the faucet adjusted to dispense coffee and cream simultaneously.

Figure 6 is a section on line 6—6 of Figure 5.

Figure 7 is a section on line 7—7 of Figure 1.

The same reference characters indicate the same parts in all of the figures.

The body of my improved faucet includes a tubular shank 12, adapted to be connected with a coffee tank, and a tubular casing 13, having a tapering bore open at both ends of the casing and forming a tapering valve seat on which the bore of the shank 12 opens. In the larger end of the casing is an arcuate internal recess 14 (Figure 7), whose ends constitute spaced apart stops 15 and 16. Projecting from the casing at an angle with the shank 12 is a lateral nipple 17, the bore of which opens on the valve seat formed by the bore of the casing. The nipple may be connected by any suitable means with a cream receptacle. 18 designates a tapered plug valve, provided with a stem 19, whereby it may be turned in opposite directions in the casing. Within the valve is an angular duct which includes a transverse portion 20, opening on the periphery of the valve, and a longitudinal portion 21, opening on the smaller end of the valve. In the periphery of the valve is formed an external groove 22 forming, with a portion of the valve seat, an external duct which is independent of the angular duct, and is open at the smaller end of the valve, as shown by Figures 1, 2 and 6.

The valve is provided with a stud 23, projecting into the recess 14, as shown by Figure 7, and movable between the stops 15 and 16, to be arrested thereby, as indicated by dotted lines in Figure 7.

28 designates a bonnet apertured to receive the stem 19, and having an annular internally threaded flange, whereby it is separably engaged with an external thread on the larger end of the casing 13. A holding-down spring 29, interposed between the bonnet and the larger end of the valve 18, maintains the tapered periphery of the valve in close contact with the seat formed by the bore of the casing 13. The location of the bonnet 28 and spring 29 wholly at the larger ends of the casing and valve, leaves the inner ends thereof entirely unobstructed for the delivery of liquids through the ducts. The arrangement is such that when the valve stud 23 abuts the stop 15, as indicated by dotted lines at the upper portion of Figure 7, the portion 20 of the angular duct registers with the shank bore, and the external groove 22 is separated from the nipple 17, as indicated by Figure 4, so that only coffee is dispensed, the path of the liquid being through the shank bore and the portions 20 and 21 of the angular duct.

When the valve stud abuts the stop 16, as indicated by dotted lines at the lower portion of Figure 7, the portion 20 of the angular duct again registers with the shank bore, and the external groove 22 registers with the bore of the nipple 17, as indicated by Figures 5 and 6, so that coffee and cream are simultaneously dispensed, the one through the shank bore and the angular duct, and the other through the nipple 17 and the external duct formed by the groove 22, and the portion of the valve seat covering the same.

When the valve is turned so that the stud 23 is in the intermediate position shown by full lines in Figure 7, both ducts are closed, is shown by Figures 1 and 3.

It will be seen that the valve is secured to the casing by means wholly at the upper end of the valve, so that there is no securing means at the lower or discharging end, the latter being entirely unobstructed. The smaller end of the valve, therefore, has sufficient area to permit the two independent ducts to open thereon. One advantage of two entirely independent ducts in a coffee and cream dispensing faucet results from the fact that there can be no mixture of cream with the coffee when only "black coffee" is desired. When both coffee and cream flow through an outlet duct common to both, some of the cream of a previous discharge is liable to remain in position to be taken up by a subsequent discharge of coffee. Another advantage results from the fact that a stream of coffee flowing through the valve, does not retard cream flowing at the same time through the valve. It has been found that in a coffee and cream dispensing faucet now in use, in which the cream enters the duct through which the coffee is dispensed, the stream of coffee retards the stream of cream. Moreover, residuum of cream is liable to remain in the delivering end portion of the cream duct after an operation of the faucet, and be taken up by coffee subsequently dispensed whether the cream duct is at that time connected with the source of supply or not.

The described arrangement of the stud 23 and stop shoulders 15 and 16, relative to the system of ducts, enables the operator to adjust the valve quickly and with certainty, the valve being turned as far as it will go in one direction, to dispense black coffee, and as far as it will go in the opposite direction, to dispense a mixture of coffee and cream.

The groove 22 opening on the unobstructed end of the valve, may be conveniently reached by a small brush inserted therein, to remove accumulations of butter fat from the groove, and from the inner end of the bore of the nipple.

In my improved faucet the external groove 22 extending across the bore of the nipple 17, and downwardly from said bore to the lower end of the valve 18, delivers the cream entirely outside the duct portion 21, so that if an operation of the faucet causing the delivery of both cream and coffee, is followed by an operation causing the delivery of coffee only, there is no residual cream in the path of the coffee.

There is no interference of one stream with the other when the faucet is operated to deliver coffee and cream, so that the stream of coffee does not retard the stream of cream, as would be the case if the cream were delivered to a duct through which coffee is flowing. A supply of cream determined by the cross-sectional area of the cream duct and unaffected by the stream of coffee is therefore assured.

I claim:

A liquid-dispensing faucet comprising a body including a tubular shank and a tubular casing having a tapered bore, open at both ends of the casing and forming a valve seat on which the bore of the shank opens, an arcuate internal recess in the larger end of the casing, whose ends constitute spaced apart stops, and a lateral nipple projecting from the casing, the bore of the nipple opening on the valve seat; a tapered plug valve provided with a stem whereby it may be turned in opposite directions in the casing, an angular internal duct opening at one end on the periphery and at the opposite end on the smaller end of the valve, an external groove forming, with a portion of the valve seat, an external duct independent of the angular duct, and open at the smaller end of the valve, and a stud projecting into said recess and movable between said stops; a bonnet separably secured to the larger end of the casing, and apertured to receive the valve stem; and a holding-down spring interposed between the bonnet and the valve, the smaller end of the valve being entirely unobstructed for the delivery of liquids through the said ducts, the arrangement being such that when the valve stud abuts one of the casing stops, liquid is dispensed only through the shank bore and the angular duct, and when the valve stud abuts the other stop, two liquids are simultaneously dispensed, the one through the shank bore and the angular duct, and the other through the nipple bore and the external duct, both ducts being closed when the valve stud is in an intermediate position.

In testimony whereof I have affixed my signature.

THOMAS E. DAVIS.